United States Patent [19]
Kuno et al.

[11] Patent Number: 5,909,321
[45] Date of Patent: Jun. 1, 1999

[54] DOUBLET LENS, VARIABLE APEX ANGLE PRISM AND DEVIATION CORRECTION DEVICE

[75] Inventors: Osamu Kuno; Nobuchika Momochi, both of Kanagawa, Japan

[73] Assignee: Sony Corporation, Tokyo, Japan

[21] Appl. No.: 08/863,042

[22] Filed: May 23, 1997

[30] Foreign Application Priority Data

May 28, 1996 [JP] Japan ..................................... 8-133665

[51] Int. Cl.⁶ .............................. G02B 9/04; G02B 27/64; G02B 5/04
[52] U.S. Cl. ........................... 359/793; 359/554; 359/837
[58] Field of Search ..................................... 359/831–832, 359/837, 793, 665, 554, 557, 720; 396/55

[56] References Cited

U.S. PATENT DOCUMENTS

| 3,884,548 | 5/1975 | Linder | 359/554 |
|---|---|---|---|
| 5,140,462 | 8/1992 | Kitagishi | 359/554 |
| 5,387,999 | 2/1995 | Hayashi | 359/683 |
| 5,519,538 | 5/1996 | Maruyama | 359/683 |

*Primary Examiner*—Georgia Epps
*Assistant Examiner*—Jordan M. Schwartz
*Attorney, Agent, or Firm*—Frommer Lawrence & Haug, LLP; William S. Frommer

[57] ABSTRACT

A doublet lens which, on being inserted between the light rays, can perform deviation correction in an afocal state without its focal length being changed. The doublet lens is arranged so that, if the radius of curvature of the concave surface of a plano-concave lens 10X is r1, the refractive index of the plano-concave lens 10X is n1, the magnitude of a gap between the plano-concave lens and the plano-convex lens is Δ, the refractive index of the gap is n2, the radius of curvature of the convex surface of a plano-convex lens 10Y is r2 and the refractive index of the plano-convex lens 10Y is n3, the following relation:

$$r2 = \frac{n3 - n2}{n1 - n2} \cdot r1 + \frac{n3 - n2}{n2} \cdot \Delta$$

is met. The angle between opposite planar surfaces is changed by rotating the plano-convex mirror, for example, of the doublet lens about its center of curvature as the center of rotation.

6 Claims, 5 Drawing Sheets

DOUBLET LENS, VARIABLE APEX ANGLE PRISM AND DEVIATION CORRECTION DEVICE

BACKGROUND OF THE INVENTION

1. Field of the Invention

This invention relates to a doublet lens, a variable apex angle prism and a deviation correction device, usable with advantage for correction of optical deflection in, for example, a camera device.

2. Description of the Related Art

Recently, for suppressing oscillations of an imaged picture by oscillations transmitted to a camera during imaging by a television camera, there is marketed a device comprised of an acceleration sensor in a camera device for detecting the an angular position of the camera device and the apex angle of the prism placed in the light path of the imaging camera lens is varied responsive to an output of the sensor for canceling the oscillations of the image due to the oscillations of the camera device by tilting the optical axis. For example, there is disclosed in Japanese Laying-Open Patent Publication 61-269572 a deviation correction device in which a special liquid is sealed on an optical axis of the lens by being sandwiched between two glass plates and a bellows interconnecting the two glass plates and in which the angular position of one of the glass plates is changed for varying the apex angle of the prism for correcting the optical axis by an angle corresponding to the angular deviation of the camera device.

There is also marketed a concave-convex lens variable-apex-angle prism, as a deviation correction optical system, in which a plano-convex lens and a plano-concave lens having equal refractive index and curvature values are set with the spherical surfaces thereof facing each other with a small gap in-between and in which one of the lenses is rotated along the spherical surface for varying the angle of two planar surfaces facing each other with the interposition of the spherical surfaces. In Japanese Laying-Open Patent Publication 6-281889, there is disclosed a deviation correcting optical system employing a variable prism comprised of the combination of convex and concave lenses.

However, in the above-mentioned variable prism of the liquid sealing type, since the liquid is sealed in a space defined between two glass plates and the bellows interconnecting the glass plates, the liquid operates as viscous resistance in case the glass plate angle is changed to render it difficult to follow up with high-speed deviations.

On the other hand, the variable apex angle prism by the combination of the convex and concave lenses has not been used to date extensively. The reason is that the curvature of the concave and convex lenses cannot be reduced sufficiently and hence the prism cannot be held for rotation about the center of curvature in a limited space, and that, if the prism is slid on a spherical surface having the same center as the concave and convex lenses, the prism is apt to be deteriorated in responsiveness due to slip or be damaged thereat.

In actuality, the method for rotationally supporting the convex lens as disclosed in the Japanese Laying-Open Patent Publication 6-281889 resides in arranging a shaft passing through the center of curvature of the lens parallel to the imaging plane outside of the lenses and the lenses are held by an arm rotatably formed on the shaft for rotationally supporting the lenses.

With this method, however, the combinatory concave and convex lenses cannot be rotated in contact with each other in view of reducing the resistance. On the other hand, the system of sealing the liquid having substantially the same refractive index as that of two glass plates between the lenses cannot be used because of increased viscous resistance. Thus, a gap needs to be formed as long as the two lenses face each other with the convex and concave surfaces thereof facing each other.

Thus the variable apex angle prism comprised of a combination of the plano-concave lens and a plano-convex lens facing each other with a gap in-between ceases to be afocal (infinite light collection type) by the combination of two lenses despite the fact that the spherical surfaces facing each other are of the same radius.

This poses no problem if the variable apex angle prism is built into an imaging optical system lying ahead and at back of the imaging optical system without the necessity of dismounting. However, if the variable apex angle-prism is mounted as when a deflection follow-up mechanism is added while the prism can be dismounted from a pre-existing lens, such an inconvenience arises that the overall flange back or the focal length be changed.

SUMMARY OF THE INVENTION

It is therefore an object of the present invention to provide a doublet lens, a variable apex angle prism and a deviation correction device that can be inserted between light rays for effecting deviation correction without changing the focal length with the optical system remaining afocal.

In one aspect, the present invention provides a doublet lens of the separate type composed of a plano-concave lens and a plano-convex lens facing each other with a small gap in-between, in which, if the radius of curvature of the concave surface of the plano-concave lens is r1, the refractive index of the plano-concave lens is n1, the magnitude of the gap between the plano-concave lens and the plano-convex lens is A, the refractive index of the gap is n2, the radius of curvature of the convex surface of the plano-convex lens is r2 and the refractive index of the plano-convex lens is n3, the following relation:

$$r2 = \frac{n3 - n2}{n1 - n2} \cdot r1 + \frac{n3 - n2}{n2} \cdot \Delta$$

holds.

In another aspect, the present invention provides a variable apex angle prism in which, if a plano-concave lens having the radius of curvature of the concave surface of r1 and a refractive index of n1 and a plano-convex lens having the radius of curvature of the convex surface of r2 and a refractive index of n3 are placed so that the concave surface and the convex surface face each other with a small gap (distance of $\Delta$ and refractive index of n2), the following relation:

$$r2 = \frac{n3 - n2}{n1 - n2} \cdot r1 + \frac{n3 - n2}{n2} \cdot \Delta$$

holds, and in that the angle between the opposite planar surfaces is changed on rotating at least one of the plano-convex lens and the plano-concave lens about the center of curvature as the center of rotation.

In yet another aspect, the present invention provides a deviation correction device including a variable apex angle prism made up of a plano-concave lens having a radius of curvature of the concave surface of r1 and a refractive index of n1 and a plano-convex lens having a radius of curvature of the convex surface of r2 and a refractive index of n3, in which the plano-concave lens and the plano-convex lens are arranged relative to each other so that, when the concave surface and the convex surface are placed for facing each other with a small gap (distance Δ and refractive index n2), the relation $$r2 = \frac{n3 - n2}{n1 - n2} \cdot r1 + \frac{n3 - n2}{n2} \cdot \Delta$$

is met and so that the angle between the opposite planar surfaces is changed on rotating at least one of the plano-concave lens and the plano-convex lens about the center of curvature as the center of rotation.

With the doublet lens of the resent invention, the light rays incident on the plano-concave lens and refracted can be made parallel to the optical axis and, even after passing through the plane of the plano-convex lens, the light rays can be made parallel to the optical axis. Stated differently, the doublet lend can operate as an afocal system, such that, if the doublet lens is mounted from outside on a lens unit of, for example, a camera device, the focal length of the imaging optical system or back-focusing is not changed.

In addition, with the doublet lens of the present invention, the light rays incident on the plano-concave lens and refracted can be made parallel to the optical axis even if the refractive index of the plano-concave lens is the same as that of the plano-convex lens and, even after passing through the plane of the plano-convex lens, the light rays can be made parallel to the optical axis. Stated differently, the doublet lens can operate as an afocal system, such that, if the doublet lens is mounted from outside on a lens unit of, for example, a camera device, the focal length of the imaging optical system or back-focusing is not changed.

With the variable apex angle prism of the present invention, the light rays incident on the plano-concave lens and refracted can be made parallel to the optical axis and can be kept parallel to the optical axis even after the light rays are passed through the plane of the plano-convex lens. The angle between the opposite planar surfaces of the lenses can be changed by rotating at least one of the plano-concave lens and the plano-convex lens about its center of curvature as the center of rotation. Stated differently, the doublet lens can operate as an afocal system, such that, if the doublet lens is mounted from outside on a lens unit of, for example, a camera device, the angle between the opposite planar surfaces of the lenses can be changed for effecting deviation correction without the focal length of the imaging optical system or back-focusing being changed.

Also, the variable apex angle prism can operate as an afocal system, even if the refractive index of the plano-concave lens is the same as that of the plano-convex lens, such that, if the doublet lens is mounted from outside on a lens unit of, for example, a camera device, the angle between the opposite planar surfaces of the lenses can be changed for effecting deviation correction without the focal length of the imaging optical system or back-focusing being changed.

With the deviation correction device of the present invention, the angle between the opposite planar surfaces can be changed by rotating at least one of the plano-concave lens and the plano-convex lens about its center of curvature as the center of rotation responsive to the deviation as detected by the deviation detection means, for correcting the orientation of the optical axis of the incident light rays, with the light rays remaining in the afocal state.

Moreover, the deviation correction device can be mounted on the camera device, while at least the variable apex angle prism can be dismounted from the camera device, so that, if the doublet lens is mounted from outside on a lens unit of, for example, a camera device, the angle between the opposite planar surfaces of the lenses can be changed without the focal length of the imaging optical system or back-focusing being changed for preventing deviation of an object image otherwise caused by deviation due to strong wind or by hand deviation

DESCRIPTION OF THE PREFERRED EMBODIMENTS

Figure 1:
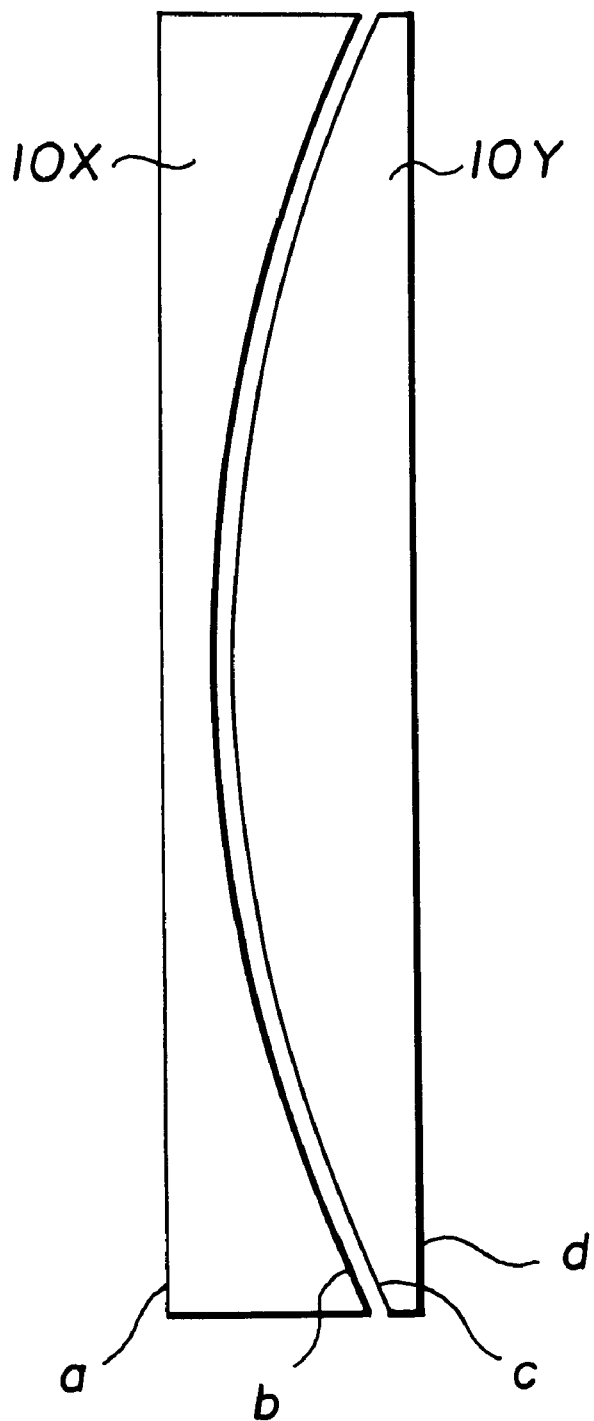
FIG. 1 is a cross-sectional view showing a doublet lens according to the present invention.

Referring to the drawings, preferred embodiments of the present invention will be explained in detail. The present invention may be applied with advantage to the doublet lens, variable apex angle prism and to the deviation correction device, mounted on, for example, a lens of the camera device, for correcting the optical deviation.

The doublet lens according to the present invention is comprised of a plano-concave lens 10X and a plano-convex lens 10Y arranged facing each other with a small gap in-between, as shown for example in FIG. 1. If the radius of curvature of the concave surface of the plano-concave lens 10X is r1, the refractive index of the plano-concave lens 10X is n1, a gap between the plano-concave lens 10X and the plano-convex lens 10Y is Δ, the refractive index of the gap is n2, the radius of curvature of the convex surface of the plano-convex lens 10Y is r2 and the refractive index of the plano-convex lens 10Y is n3, the following relation:

$$r2 = \frac{n3 - n2}{n1 - n2} \cdot r1 + \frac{n3 - n2}{n2} \cdot \Delta \qquad (1)$$

holds.

If the refractive indices of the plano-concave lens 10X and the plano-convex lens 10Y are both n1, the following relation holds:

$$r2 = r1 + \frac{n1 - n2}{n2} \cdot \Delta \qquad (2)$$

With the variable apex angle prism according to the present invention, the angle of the facing surfaces is changed by rotating one of the lenses of the doublet lens, such as the plano-convex lens 10Y, about its center of curvature. Of course, the plano-concave lens 10X may be rotated about the center of curvature for changing the angle between the facing surfaces.

Figure 2:
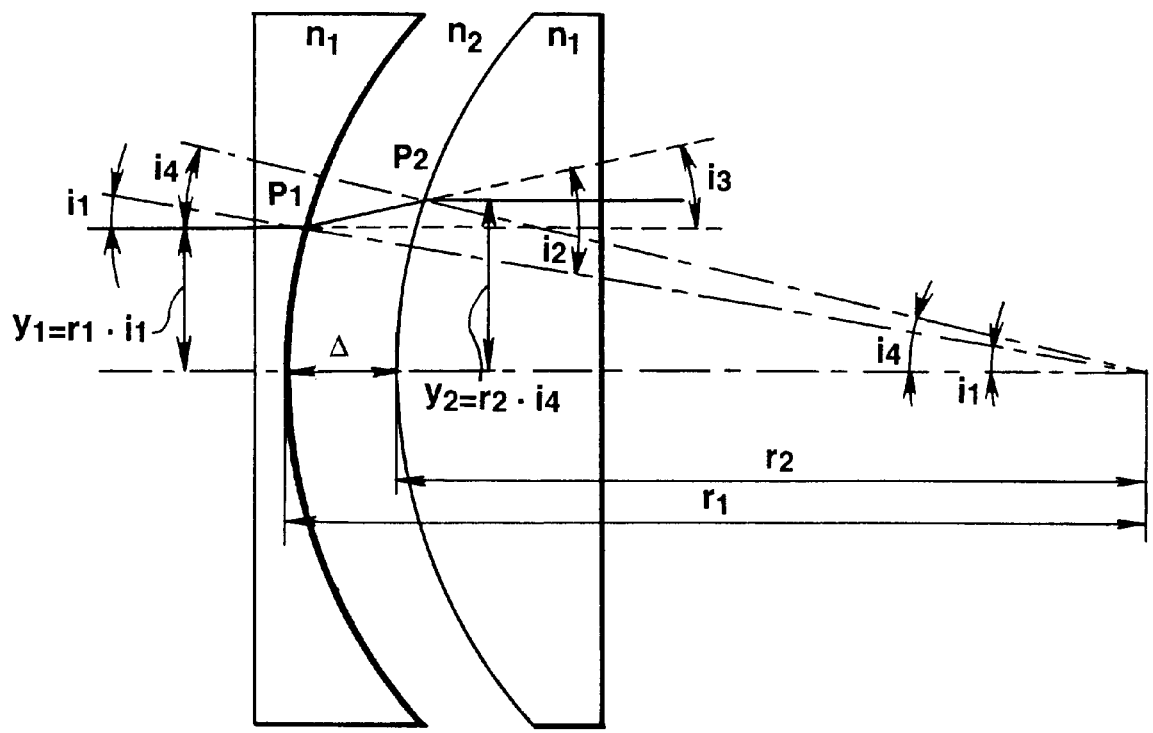
FIG. 2 shows a light path when the plano-concave lens and the plano-convex lens of the doublet lens are of the same refractive index value.

The reason the above-described doublet lens is afocal (of the infinite light collection type) is explained by referring to FIG. 2.

The light rays parallel to the optical axis is incident on the plane of the plano-convex lens 10Y with a height y1 and on the spherical surface of a radius r1 with the same height. If the angle the normal line drawn on the spherical surface at a point of incidence of the light rays thereon makes with the optical axis is i1, the angle i1 is the angle of incidence of the light rays on the spherical surface. If the angle of refraction of the light rays is i2, $$\sin i2 + \frac{n1}{n2}\sin i1$$

If approximation of the paraxial light rays (sin i=i for i<1) is used, the above equation can be rewritten to $$i2 = \frac{n1}{n2} i1$$

If now the angle the refracted light rays make with the optical axis is i3, $$i3 = i2 - i1 = \left(\frac{n1}{n2} - 1\right) \cdot i1$$

If the point of incidence of the light rays on the convex spherical surface of the plano-convex lens 10Y is P2, the height of the pint P2 is y2 and the distance between the plano-concave lens 10X and the plano-convex lens 10Y is Δ, $$y2 = y1 + \Delta \cdot \sin i3$$
$$\cong y1 + \Delta \cdot i3 (\because i3 \ll 1)$$

If the angle the normal line drawn to the convex spherical surface at point P is i4 and the radius of the spherical surface is r2, $$y2 = r2 \cdot \tan i4$$
$$\cong r2 \cdot i4$$
$$y1 = r1 \cdot \tan i1$$
$$\cong r1 \cdot i1$$

Meanwhile, tan i=i for i<1).

Therefore, $$i4 = \frac{r1 + \Delta \cdot \left(\frac{n1}{n2} - 1\right)}{r2} i1 \quad (3)$$

If i4=i1, that is if the tilt of the normal line to the first plane of incidence is equal to that of the normal line to the second plane of incidence and the refractive index of the convex lens is equal to that of the concave lens, the light rays are passed through the two parallel boundary surfaces from the medium of the refractive index n1 to the medium of the refractive index n2 and again returned to the medium of the refractive index n1, with the light rays maintaining the original angle. Thus, if the equation (2) is met, the coefficient of i1 of the above equation is equal to 1, such that the light rays are incident at a right angle on the surface of the convex lens, while remaining parallel to the optical axis as are the incident light rays to maintain the angle of incidence.

Figure 3:
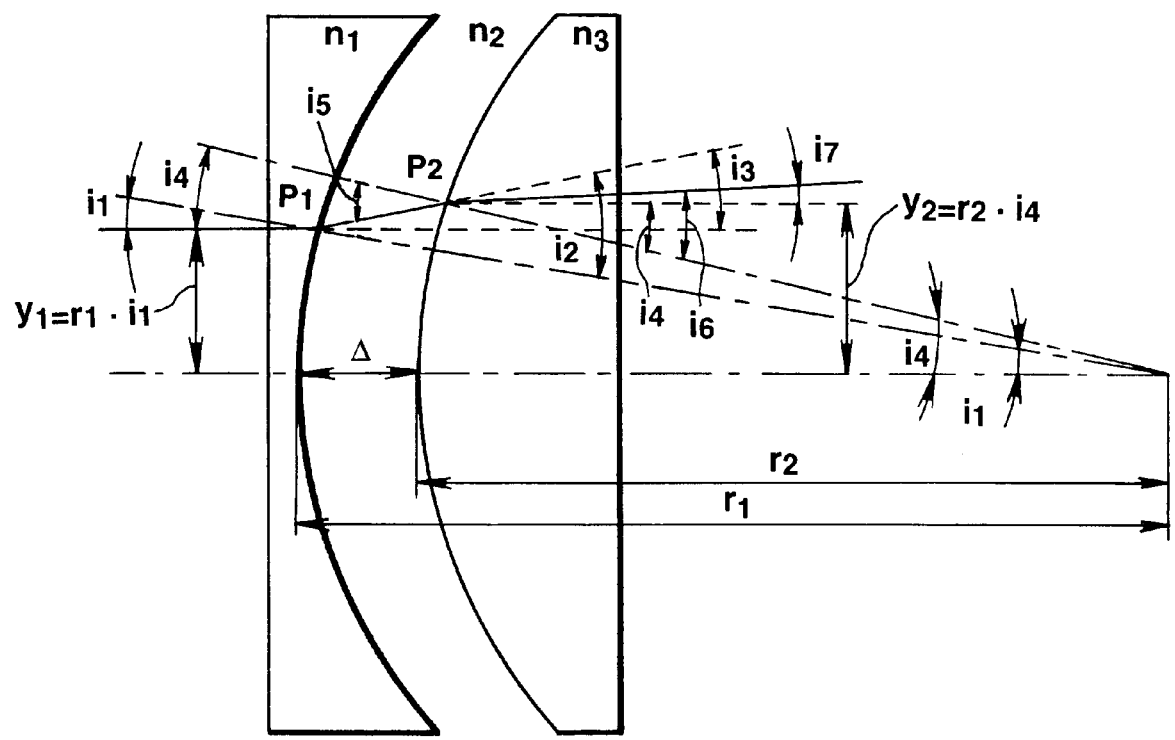
FIG. 3 shows the light path when the plano-concave lens and the plano-convex lens of the doublet lens are of different refractive index values.

Referring to FIG. 3, a case in which the refractive index of a second lens (plano-convex lens 10Y of the present embodiment) differs from that of the first lens is explained. In such case, the above description is valid up to equation (3). However, since the two lenses have refractive indices different from each other, the outgoing light is not parallel to the incident light rays, despite the fact that tilt of the normal line drawn to the surface at P1 coincides with that drawn to the surface at P2. Thus the refraction at P2 needs to be checked. First, if the angle of incidence and the angle of refraction at P2 are i5 and i6, respectively, $$i5 = i3 + i4$$

and $$i6 \cong \frac{n2}{n3} i5$$

Therefore, an angle i7 the light rays refracted at P2 make with the optical axis is given by:

$$i7 = i6 - i4 = \frac{n2}{n3} \cdot i5 - i4 =$$

$$\frac{n2}{n3}(i3 + i4) - i4 = \frac{n2}{n3} \cdot i3 + \left(\frac{n2}{n3} - 1\right)i4 = \frac{n2}{n3}\left(\frac{n1}{n2} - 1\right) \cdot i1 + \left(\frac{n1}{n2} - 1\right) \cdot \frac{r1 + \Delta \cdot \left(\frac{n1}{n2} - 1\right)}{r2} i1 = \left[\frac{n1}{n3} - \frac{n2}{n3} + \frac{(n2 - n3)\left\{\left(r1 + \Delta \cdot \left(\frac{n1}{n2} - 1\right)\right)\right\}}{n3 \cdot r2}\right] \cdot i1$$

If the portion delimited by brackets [ ] is zero, i7=0, so that the refracted light rays are parallel to the optical axis and remains parallel to the optical axis even after passing through the plane of the plano-convex lens 10Y. Since this holds if the condition of the equation (1) is met, the equation represents the condition for the afocalness for a doublet lens comprised of the combination of a plano-convex lens and a plano-concave lens.

Since the doublet lens according to the present invention is afocal, the back-focusing of the entire lens is not changed even if the lens is placed ahead of the imaging optical system, such that there is no necessity of re-focusing for mounting and dismounting, while the infinite point or the nearest imaging distance is not changed. Therefore, the variable apex point prism according to the present invention may be optimally used as a removable adapter for correcting the optical axis Referring to the drawings, a camera device employing the deviation correction device according to the present invention is explained. The deviation is configured for driving the variable apex angle prism responsive to the deviation produced in a main camera body member for prohibiting deviation from being produced in the object image.

Figure 4:
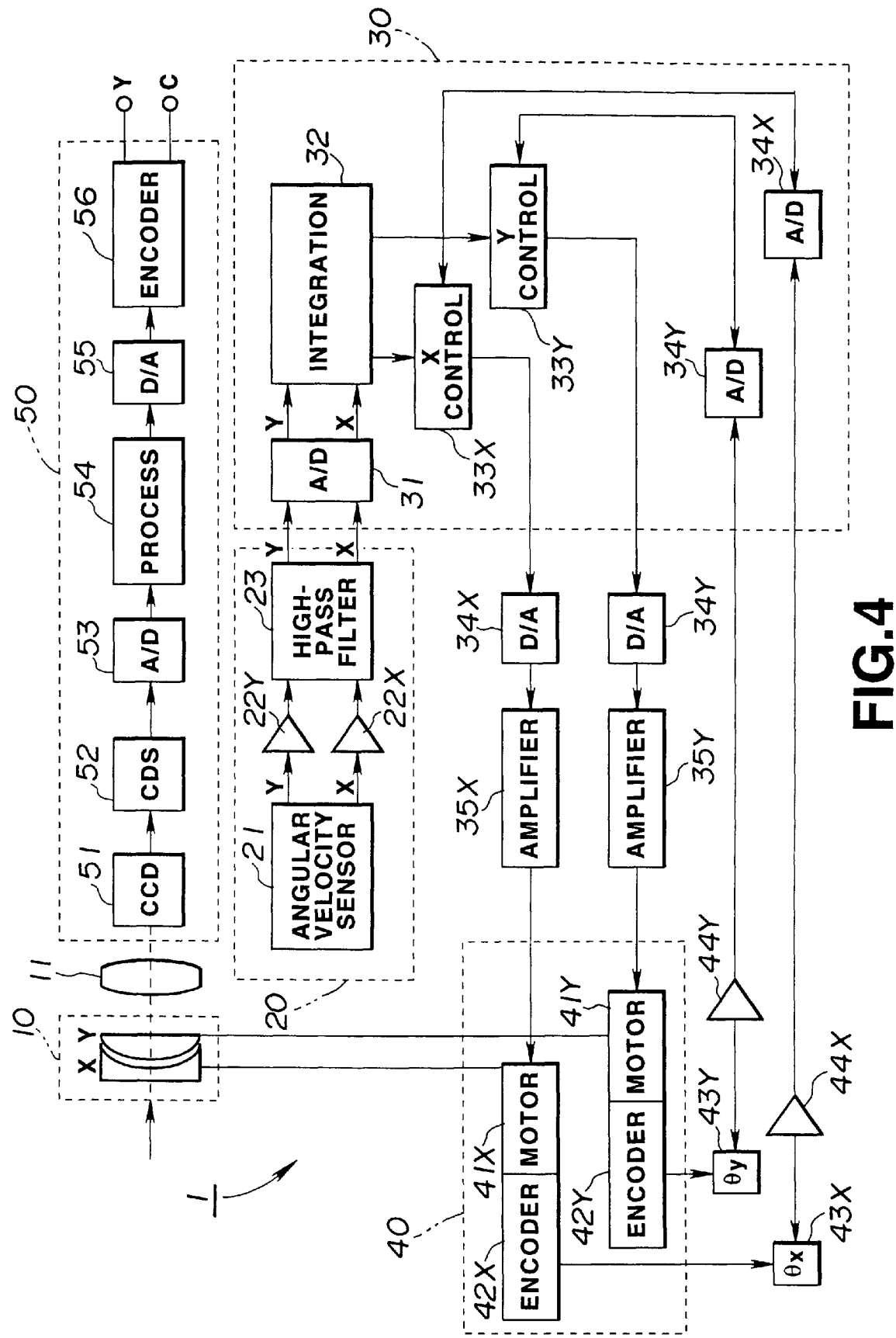
FIG. 4 is a block diagram showing an illustrative structure of a camera device employing a deviation correction device according to the present invention.

Referring to FIG. 4, the camera device 1 includes the above-mentioned variable apex angle prism 10, a deviation detection unit 20 for detecting the deviation in the camera device 1 itself, a micro-computer 30 for executing control for correcting the detected deviation, a driving unit 40 for driving the variable apex angle prism 10 under control by the micro-computer 30 and a camera unit 50 for generating imaging signals corresponding to the imaging light incident thereon via the variable apex angle prism 10. In the camera device 1, the micro-computer 30 drives the variable apex angle prism 10 via the driving unit 40 responsive to the deviation as detected by the deviation detection unit 20. Thus the camera device 1 can optically correct deviation of the object image caused by, for example, hand deviation.

Specifically, the variable apex angle prism 10 is made up of the above-mentioned plano-concave lens 10X and the plano-concave lens 10Y, with the plane a of the plano-concave lens 10X facing the object and the plane d of the plano-convex lens 10Y facing the lens 11. The center of curvature of the plano-concave surface b and that of the plano-convex surface c are coincident on the optical axis passing through the lens 11 and through the center of a CCD image sensor 51 as later explained.

Since the plano-concave lens 10X can be rotated in the horizontal direction (in the direction of the X-axis) about the center of curvature as the center, while the plano-convex lens 10Y can be rotated in the vertical direction (in the direction of the Y-axis) about the center of curvature as the center, the variable apex angle prism 10 can correct the orientation of the optical axis between the two lenses.

Meanwhile, if the plano-concave lens 10X and the plano-convex lens 10Y are rotated along the concave surface b and along the convex surface c, one or both of the lenses 10X, 10Y can be rotated about its center of curvature. Of course, if the concave surface b and the convex surface c of the variable apex angle prism 10 can be maintained in the above relation, the plano-concave lens 10X or the plano-convex lens 10Y of the variable apex angle prism may be configured for facing the object for correcting the orientation of the optical axis.

The deviation detection unit 20 includes an angular velocity sensor 21 for outputting an angular velocity signal corresponding to the deviation of the camera device 1, inverter circuits 22X, 22Y for inverting the angular velocity signal and a by-pass filter 23 for outputting signals of a pre-set band component of the signal supplied from the inverter circuits 22X, 22Y. The angular velocity sensor 21 is made up of a horizontal deviation amount detection sensor for detecting the amount of deviation in the horizontal direction and a vertical deviation amount detection sensor for detecting the amount of deviation in the vertical direction.

The micro-computer 30 includes an A/D converter 31, an integration circuit 32, a control circuit 33X in the horizontal direction and a control circuit 33Y in the vertical direction.

The integration circuit 32 performs integration for obtaining angular data from angular velocity data. The control circuit for the horizontal direction 33X judges, based on the angular signals obtained from the angular velocity signals and from the angular signals obtained from driving of the variable apex angle prism 10, as later explained, whether or not the angular changes are derived from hand deviation or those derived from panning (slow swinging of the camera device in the horizontal direction). Similarly, the control circuit for the vertical direction 33Y judges, based on the above two signals, whether or not the angular changes are derived from hand deviation or those derived from tilting (slow swinging of the camera device in the vertical direction). That is, if the angular changes are judged to be those caused by panning or tilting, the control circuit for the horizontal direction 33X and the control circuit for the vertical direction 33Y do not control the driving device 40. If the angular changes are judged to be those caused by hand deviation, the control circuits output correction data in the horizontal direction and in the vertical direction for correction.

The driving unit 40 includes a motor 41X for driving the plano-concave lens 10X in the horizontal direction, a motor 41Y for driving the plano-convex lens 10Y in the vertical direction, a rotary encoder 42X for detecting the angle of tilt of the plano-concave lens 10X and a rotary encoder 42Y for detecting the angle of tilt of the plano-convex lens 10Y.

The motor 41X has its driving shaft connected to a plano-concave lens 10X and can rotate the plano-concave lens 10X in the horizontal direction while the center of curvature of the concave surface b of the plano-concave lens 10X is maintained on the above-described optical axis. The motor 41Y has its driving shaft connected to the plano-convex lens 10Y and can rotate the plano-convex lens 10Y in the vertical direction while the center of curvature of the convex surface c of the plano-convex lens 10Y is maintained on the optical axis. The rotary encoders 42X, 42Y detect the tilt of the driving shafts of the motors 41X, 41Y for outputting angular signals specifying the angle of tilt specifying the angle of tilt of the plano-concave lens 10X and the plano-convex lens 10Y, respectively. The rotary encoders 42X, 42Y are not limited to those described above provided that the encoders used can detect tilt of the plano-concave lens 10X and the plano-convex lens 10Y relative to the optical axis.

The camera device 50 includes a CCD image sensor 51, a correlated double sampling (CDS) circuit 52, an A/D converter 53, a processing circuit 54, a D/A converter 55 and an encoder 56.

The CCD image sensor 51 of the camera unit 50 is of a three CCD type, as an example, and outputs video signals composed of red, green and blue responsive to the imaging light incident thereon via variable apex angle prism 10 and the lens 11. The CDS circuit 52 reduces the so-called random noise contained in the video signals supplied from the CCD image sensor 51 and routes the video signals to the A/D converter 53. The processing circuit 54 performs shading correction of correcting level fluctuations of the dark signal, lens fluctuations, gamma correction or contour correction on imaging data digitized by the A/D converter 53 for routing the imaging data to the D/A converter 55. The encoder 56 converts the video signals, converted by the D/A converter into analog signals, into luminance signals and chroma signals, for example, and outputs the resulting luminance signals and chroma signals.

Meanwhile, the deviation correction device according to the present invention can be mounted from above the imaging optical system of the above camera device, and can be easily mounted on or dismounted from the camera device. The power used for driving the hand deviation device is fed from the camera device 1.

If the hand deviation is produced in the camera device 1 as described above, the angular velocity sensor 21 outputs angular velocity signals corresponding to the deviation in the horizontal direction and in the vertical direction. The inverter circuits 22X, 22Y invert the angular velocity signals fed from the angular velocity sensor 21 to output inverted angular velocity signals which are signals of canceling the deviation. The high-pass filter 23 eliminates band components unnecessary for the integration from the inverted angular velocity signals and routes the inverted angular velocity signals to the A/D converter 31.

The integration circuit 32b integrates the inverted angular velocity data fed thereto via A/D converter 31 to produce inverted angular data. The control circuit 33X in the horizontal direction and the control circuit 33Y in the vertical direction output correction data for the horizontal direction and correction data for the vertical direction based on the inverted angular data from the integration circuit 32 and inverted angular data from the driving unit 40 as later explained.

The D/A converters 34X, 34Y convert the correction data from the control circuit 33X in the horizontal direction and the control circuit 33Y in the vertical direction into analog signals to output correction signals. These correction signals are fed via amplifier circuits 35X, 35Y to motors 41X, 41Y.

Figure 5:
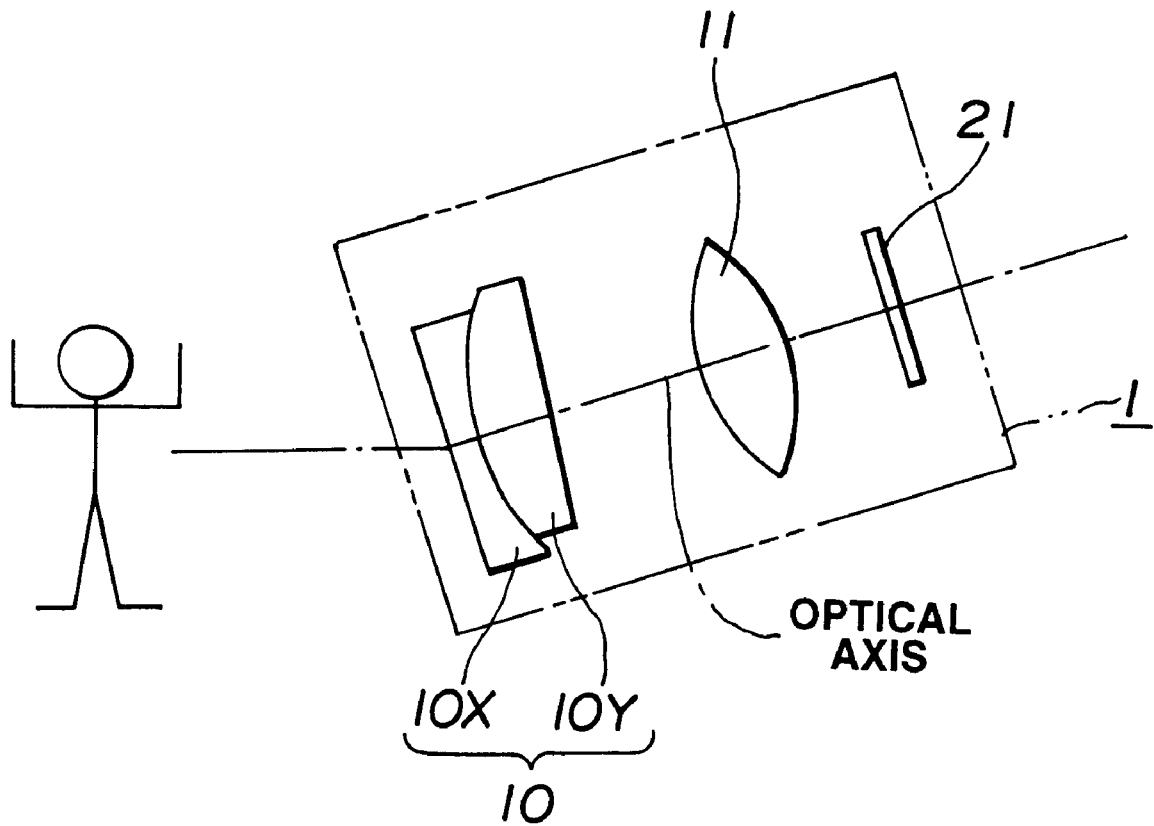
FIG. 5 shows the state in which the direction of the optical axis is corrected by the deviation correction device of FIG. 4.

Based on the supplied correction signals, the motors 41X, 41Y drive the plano-concave lens 10X and the plano-convex lens 10Y for correcting the optical axis, as shown for example in FIG. 5. The rotary encoders 42X, 42Y detect the tilt of the driving shafts of the motors 41X, 41Y for outputting pulse signals corresponding to the prevailing angle of tilt of the lenses relative to the optical axis.

The pulse signals outputted by the rotary encoders 42X, 42Y are converted by angle correction circuits 43X, 43Y, respectively, into angular signals specifying the tilt of the plano-concave lens 10X and the plano-convex lens 10Y in the horizontal and vertical directions with respect to the optical axis, respectively. These angular signals are inverted in polarity by inverter circuits 44X, 44Y, respectively, so as to be supplied to A/D converters 34X, 34Y, respectively.

The control circuit 33X in the horizontal direction and the control circuit 33Y in the vertical direction output correction data by the inverted digital angular data from the A/D converters 34X, 34Y and from the inverted angular data by hand deviation detection by the deviation detection unit 20.

The micro-computer 30 drives the variable apex angle prism 10, via the driving unit 40, based on the tilt of the plano-concave lens 10X and the plano-convex lens 10Y relative to the optical axis and the deviation as detected by the deviation detection unit 20, for correcting the orientation of the optical axis of the imaging light incident on the camera device.

That is, the camera device employing the above deviation correction device can produce deviation-free video signal of the imaged object without being influenced by deviations due to strong wind or hand deviation In addition, the above deviation correction device can be mounted on or dismounted from the camera device, and also can correct the orientation of the optical axis, responsive to the deviation, with the light rays remaining in the afocal state. Thus, if the user of the above-described deviation correction device, adjusting the focal length of the imaging optical system of the camera device or back-focusing and subsequently mounting the deviation correction device on the camera device for correcting the deviation, is not in need of re-adjusting the focal length and hence is relieved of the operational load. If there is no need for deviation correction, as when the camera device is set on a tripod for carrying out imaging without adverse effects by, for example, strong wind, the user can dismount the deviation correction device in order to effect imaging without varying the pre-adjusted focal length or back-focusing. That is, if deviation correction is not performed, the camera device may be reduced in weight to relieve the load otherwise imposed on the user.

The deviation correction device of the instant embodiment can be mounted on and dismounted from the camera device. However, the present invention is not limited thereto. That is, the technical concept of the present invention is to make follow-up correction of the deviation produced in the camera device using the above-described variable apex angle prism, such that it is naturally possible to have the deviation detection means and the control means enclosed within the camera device in order enable dismounting of the variable apex angle prism and rotary means.

In the following Examples, a denotes the planar surface of the plano-concave lens 10X, b denotes the concave surface of the plano-concave lens 10X, c denotes the convex surface of the plano-convex lens 10Y, and d denotes the planar surface of the plano-convex lens 10Y. Also, r denotes the radius of curvature, t denotes the thickness of the medium passing through the optical axis, Index denotes the refractive index, Glass denotes the material of the lens and Height denotes its height. Meanwhile, r=0 means an infinite radius of curvature, that is denotes a planar surface.

EXAMPLE 1

TABLE 1

| # | r | t | Index | Glass | Height |
|---|---|---|---|---|---|
| a | 0.000 | 3.000 | 1.51633 | BK7 | 50.00 |
| b | 100.000 | 1.000 | | | 50.00 |
| c | 100.516 | 15.0000 | 1.51633 | BK7 | 50.00 |
| d | 0.000 | | | | 50.00 |

At this time, the combined focal length is infinite, that is the lens is afocal.

The following Table 2 shows the values of the refractive index of the glass material of the doublet lens through which are passed light rays of a wavelength of 656.27 nm, a wavelength of 587.56 nm and a wavelength of 435.84 nm.

TABLE 2

| | Refractive Index | | |
|---|---|---|---|
| | 587.56 | 435.84 | 658.27 |
| a BK7 | 1.51633 | 1.52621 | 1.51385 |
| c BK7 | 1.51633 | 1.52621 | 1.51385 |

EXAMPLE 2

As a Comparative Example for Example 1, a case in which two lenses have the equal radius of curvature is explained.

TABLE 3

| # | r | t | Index | Glass | Height |
|---|---|---|---|---|---|
| a | 0.000 | 3.0000 | 1.51633 | BK7 | 50.00 |
| b | 100.000 | 1.0000 | | | 50.00 |
| c | 100.000 | 15.0000 | 1.51633 | BK7 | 50.00 |
| d | 0.000 | | | | 50.00 |

The combined focal length is 37509.819 mm.

TABLE 4

| | Refractive Indices | | |
|---|---|---|---|
| | 587.56 | 435.84 | 656.27 |
| a BK7 | 1.51633 | 1.52621 | 1.51385 |
| c3 BK7 | 1.51633 | 1.52621 | 1.51385 |

EXAMPLE 3

The case in which the two lenses have different refractive index values is explained.

TABLE 5

| # | r | t | Index | Glass | Height |
|---|---|---|---|---|---|
| a | 0.000 | 3.0000 | | BK7 | 50.00 |
| b | 100.000 | 2.0000 | 1.51633 | | 50.00 |
| c | 112.139 | 15.0000 | | LF1 | 50.00 |
| d | 0.000 | | 1.57309 | | 50.00 |

At this time, the combined focal length is infinite, that is the lens is afocal.

TABLE 6

| | Refractive Indices | | |
|---|---|---|---|
| | 587.56 | 435.84 | 656.27 |
| a BK7 | 1.51633 | 1.52621 | 1.51385 |
| c LF1 | 1.57309 | 1.59026 | 1.56911 |

EXAMPLE 4

As a Comparative Example for Example 3, a case in which two lenses have the equal radius of curvature is explained.

TABLE 7

| | r | t | Index | Glass | Height |
|---|---|---|---|---|---|
| | | | 1.51633 | BK7 | 50.00 |
| a | 0.000 | 3.0000 | | | 50.00 |
| | 100.000 | | 1.57309 | LF1 | 50.00 |
| b | 100.000 | 2.000 | | | 50.00 |
| | | 15.0000 | | | |
| c | 0.000 | | | | |
| d | | | | | |

The combined focal length is 1595.411 mm.

TABLE 8

| | Refractive Indices | | |
|---|---|---|---|
| | 587.56 | 435.84 | 656.27 |
| a BK7 | 1.51633 | 1.52621 | 1.51385 |
| c3 LF1 | 1.57309 | 1.59026 | 1.56911 |

What is claimed is:

1. A doublet lens of the separate type for deviation correction in an optical system comprising a plano-concave lens and a plano-convex lens placed so that the concave surface and convex surface are facing each other with a small gap in-between, wherein if the radius of curvature of the concave surface of the plano-concave lens is r1, the refractive index of the plano-concave lens is n1, the magnitude of the distance of the gap between the plano-concave lens and the plano-convex lens is Δ, the refractive index of the gap is n2, the radius of curvature of the convex surface of the plano-convex lens is r2 and the refractive index of the plano-convex lens is n3, the following relation:

$$r2 = \frac{n3 - n2}{n1 - n2} \cdot r1 + \frac{n3 - n2}{n2} \cdot \Delta$$

holds.

2. The doublet lens as claimed in claim 1 wherein the refractive index of the plano-concave lens and that of the plano-convex lens are both n1, and wherein the following relation $$r2 = r1 + \frac{n1 - n2}{n2} \cdot \Delta$$

holds.

3. A variable apex angle prism for deviation correction in an optical system comprising a plano-concave lens having a radius of curvature of the concave surface of r1 and a refractive index of n1 and a plano-convex lens having a radius of curvature of the convex surface of r2 and a refractive index of n3 are placed so that the concave surface and the convex surface face each other with a small gap having a distance of Δ and refractive index of n2, the following relation:

$$r2 = \frac{n3 - n2}{n1 - n2} \cdot r1 + \frac{n3 - n2}{n2} \cdot \Delta$$

holds, and in that the angle between the opposite planar surfaces is changed on rotating at least one of the plano-convex lens and the plano-concave lens about the center of curvature as the center of rotation.

4. The variable apex angle prism as claimed in claim 3 wherein the refractive index of the plano-convex lens and that of the plano-concave lens are both n1, and wherein the following relation:

$$r2 = r1 + \frac{n1 - n2}{n2} \cdot \Delta$$

holds.

5. A deviation correction device comprising:

a variable apex angle prism comprising a plano-concave lens having a radius of curvature of the concave surface of r1 and a refractive index of n1 and a plano-convex lens having a radius of curvature of the convex surface of r2 and a refractive index of n3, said plano-concave lens and the plano-convex lens being arranged relative to each other so that the concave surface and the convex surface are placed facing each other with a small gap having a distance Δ and refractive index n2, the relation $$r2 = \frac{n3-n2}{n1-n2} \cdot r1 + \frac{n3-n2}{n2} \cdot \Delta$$

is met and so that the angle between the opposite planar surfaces is changed on rotating at least one of said plano-concave lens and the plano-convex lens about the center of curvature as the center of rotation.

6. The deviation correction device as claimed in claim 5 wherein the refractive index of said plano-concave lens and that of said plano-convex lens are both n1, and wherein the relation $$r2 = r1 + \frac{n1-n2}{n2} \cdot \Delta$$

is met.

* * * * *